United States Patent [19]
Huebner

[11] Patent Number: 5,875,689
[45] Date of Patent: Mar. 2, 1999

[54] PARKING BRAKE OPERATING MECHANISM CABLE REEL ASSEMBLY HAVING A BUSHING AND SUPPORT PIN

[75] Inventor: Mark Andrew Huebner, Clinton Township, Mich.

[73] Assignee: Dura Automotive Systems, Inc., Rochester Hills, Mich.

[21] Appl. No.: 804,676

[22] Filed: Feb. 25, 1997

[51] Int. Cl.⁶ .............................. G05G 1/04; B60T 7/08
[52] U.S. Cl. ................................................ 74/535; 74/529
[58] Field of Search .......................... 74/535, 536, 537, 74/538, 529, 501.6, 512

[56] References Cited

U.S. PATENT DOCUMENTS

| | | | |
|---|---|---|---|
| 3,481,217 | 12/1969 | Maeda | 74/535 X |
| 4,841,798 | 6/1989 | Porter et al. | 74/535 X |
| 4,872,368 | 10/1989 | Porter | 74/512 X |
| 5,001,942 | 3/1991 | Boyer | 74/538 X |
| 5,201,148 | 4/1993 | Rupert et al. | |
| 5,211,072 | 5/1993 | Barlas et al. | 74/535 X |
| 5,309,786 | 5/1994 | Pare et al. | 74/512 |
| 5,448,928 | 9/1995 | Harger | 74/512 X |
| 5,533,420 | 7/1996 | Perisho | 74/535 X |

Primary Examiner—Charles A. Marmor
Assistant Examiner—MaryAnn Battista
Attorney, Agent, or Firm—D. D. McGraw; Douglas E. Sittler; Michael K. Boyer

[57] ABSTRACT

A vehicle parking brake operating mechanism having an arcuately movable brake handle arcuately rotatably mounted on a pin secured to a fixed mounting bracket, a cable reel assembly having a reel section attached to the brake handle and a hub section arcuately rotated on a sleeve bushing which is received on the pin in slidable but non-rotatable relation therewith, and a cable take-up spring in the cable reel assembly reel section having one end attached to that reel section and the other end attached to the a portion of the sleeve bushing which extends through the cable reel section as well as through the cable reel assembly hub section. The bushing is of lesser specific gravity than the pin and primarily withstands only bearing loads from the hub section to the pin and torsional loads exerted by the take-up spring. The pin is subjected to cantilever loads as well as bearing loads. The pin is preferably made of steel while the bushing is made of a suitable plastic or light metal alloy or powdered metal. The bushing may be solidly made or may have indentations in its inner and outer surfaces to make it lighter than it would be when it is solidly made.

18 Claims, 2 Drawing Sheets

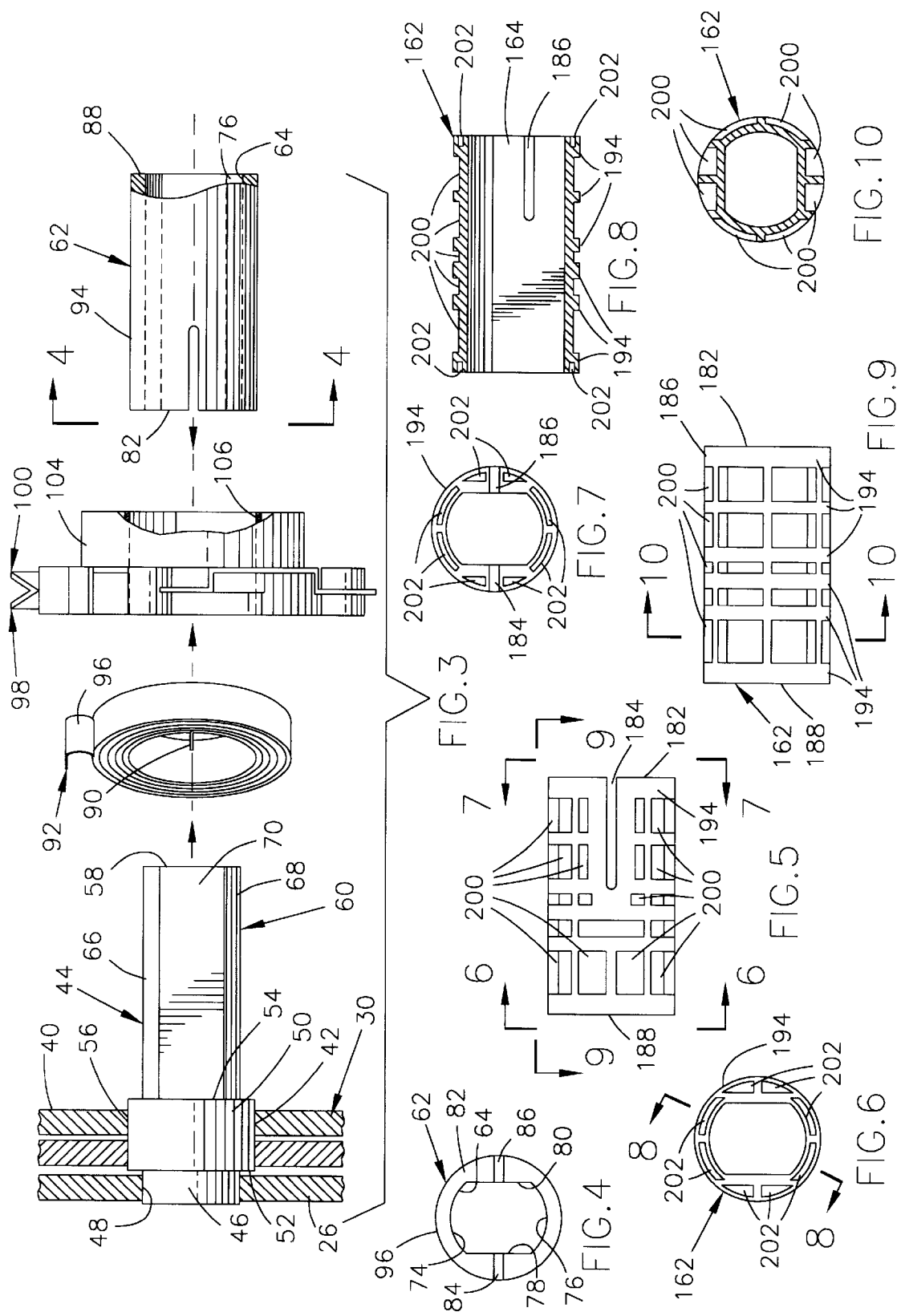

PARKING BRAKE OPERATING MECHANISM CABLE REEL ASSEMBLY HAVING A BUSHING AND SUPPORT PIN

FIELD OF THE INVENTION

The invention relates to a cable reel assembly for a parking brake operating mechanism in which the parking brake handle is arcuately movable on a support pin fixedly secured to a mounting plate, a brake operating cable reel assembly is secured to the brake handle and contains a take-up spring having one end attached to the reel assembly housing and the other end attached to a bushing received through the reel assembly housing so that the housing is arcuately rotatable on the bushing, the bushing being axially slidable but rotatably fixed to the support pin.

BACKGROUND OF THE INVENTION

Prior similar constructions have employed a one-piece combination rivet pin and bushing element machined from suitable steel bar stock.

SUMMARY OF THE INVENTION

The parking brake operating mechanism in which the structure embodying the invention is used includes a mounting bracket, a parking brake actuator handle, a brake actuating cable, and the combined the cable reel assembly and support pin embodying the invention. The reel element of the cable reel assembly has a hub section and a reel section, a take-up spring within a recess formed in the reel section, a bushing extending axially through the hub and reel sections in rotatably supporting relation with the hub and having the inner end of the take-up spring attached to the bushing portion within the reel section, and a support pin extending through the bushing so that the bushing is supported in axial slidable relation by and non-rotatably attached to the pin.

The pin has a bearing surface on which the parking brake handle is rotatably mounted and supported for arcuate movements, the cable reel section being secured to the parking brake handle and therefore being rotatable with that handle. The pin has an end adjacent the pin bearing surface which is shaped so as to be non-rotatably secured to a mounting bracket with the parking brake handle and the cable reel section being arcuately movable relative to the bushing, the pin and the mounting bracket. That pin end may be deformed in a riveting manner to form its secure attachment to the mounting bracket.

The take-up spring is preferably a spirally wound spring similar to a clock spring, and has an inner end and an outer end. Since the outer end of the take-up spring is secured to the cable reel section, that spring end moves with arcuate rotational movements of the parking brake handle and the cable reel section. However, since that spring's inner end is secured to the bushing which is non-rotatably mounted on the pin, that spring end does not rotate with arcuate rotational movements of the parking brake handle and the cable reel section. The take-up spring is therefore torsionally loaded and unloaded to varying degrees as such arcuate rotational movements take place during apply and release operations of the parking brake 122 schematically represented in FIG. 1.

The pin is required to support the high loads exerted from the parking brake handle and the reel through the pin to the mounting bracket. These loads are cantilever-applied bending loads as well as lateral compression bearing loads between the pin and the mounting bracket and the parking brake handle, and between the pin and the bushing.

However, the bushing is only required to support, and therefore is only subjected to, lateral compression bearing loads exerted between the reel hub section and the bushing and also exerted between the bushing and the pin, and to torsionally applied loads between the take-up spring inner end and the bushing.

The pin is therefore made of a suitable material such as steel so as to withstand the heavier loads imposed on it, while the bushing is made of a lighter weight material such as a suitable plastic or a metallic alloy or powdered metal.

The pin may be made by a less expensive cold heading process, for example, rather than being machined from bar stock, reducing its cost. SAE 1010 steel is an example of the steel which may be used. Of course other steels may be used to make this part. Because the bushing is separately made of a lighter weight material which can accommodate the loads placed on it, but would not accommodate the heavier loads placed on the rivet pin itself, the combination of the pin and bushing of the invention results in cost savings on the order of 80% while achieving an advantageous weight reduction.

Examples of suitable sleeve bushing materials include: Nylon™ 6/6 with a suitable quantity of glass fill; Delrin™ 100 with one or more well-known strength additives; zinc aluminum 8 and similar aluminum alloys; and powdered metal.

As is well known by those skilled in the art, "polyamide" is the generic chemical name of the material bearing DuPont's trademark tradename "Nylon." Similarly, "polyacetal" (sometimes referred to by those skilled in the art as "acetal") is the generic chemical name of the material bearing DuPont's trademark or tradename Delrin. Therefore, at any place herein, including any of the claims, when either of those trademarks or tradenames is used, its generic chemical name is to be considered to be present.

It is well-known to strengthen Nylon™ with the addition of glass fibers. For example, see U.S. Pat. No. 4,133,287—Downs. It is also well-known to use other strength additives with various plastics, including Nylon™ and Delrin™, such as mineral fillers, various organic and inorganic fibrous materials, and carbon filaments. For example, silicate mineral fillers are known to be used in irregular granular form, the granules interlocking and being held in place by the plastic so as to provide greater strength. Fibers and filaments may be arranged in the plastic in random fashion or may be aligned to provide greater strength in one direction than another. All of these strength additives and their noted variations have been well-known and used by those skilled in the art for years before the making of the herein disclosed and claimed invention. Their inclusion is simply to provide a more comprehensive description of the operative structure having the best mode.

All of these materials are to have a specific gravity which is less than the specific gravity of the support pin, with the plastic materials of which the sleeve bushing, with or without strength additives, is made having specific gravities which are substantially less than the specific gravity of the support pin. This permits weight reduction without adversely affecting the performance of the sleeve bushings.

BRIEF DESCRIPTION OF THE DRAWINGS

FIG. 3 is a preassembly exploded view of the parts of the assembly embodying the invention, indicating their manner of assembly to form the assembly of the invention.

FIG. 4 is an end view of the sleeve bushing of FIG. 3, taken in the direction of arrows 4—4 of that Figure.

FIG. 5 is an elevation view of a modified sleeve bushing which embodies another aspect of the invention.

FIG. 6 is a view of one end of the modified sleeve bushing of FIG. 5 taken in the direction of arrows 6—6 of that Figure.

FIG. 7 is a view of the other end of the modified sleeve bushing of FIG. 5 taken in the direction of arrows 7—7 of that Figure.

FIG. 8 is a cross section view of the modified sleeve bushing of FIGS. 5–7 taken in the direction of arrows 8—8 of FIG. 6.

FIG. 9 is an elevation view of the modified sleeve bushing of FIGS. 5–8 taken in the direction of arrows 9—9 of FIG. 5.

FIG. 10 is a cross section view of the modified sleeve bushing of FIGS. 5–9 taken in the direction of arrows 10—10 of FIG. 9.

DETAILED DESCRIPTION OF THE INVENTION

Figure 1:
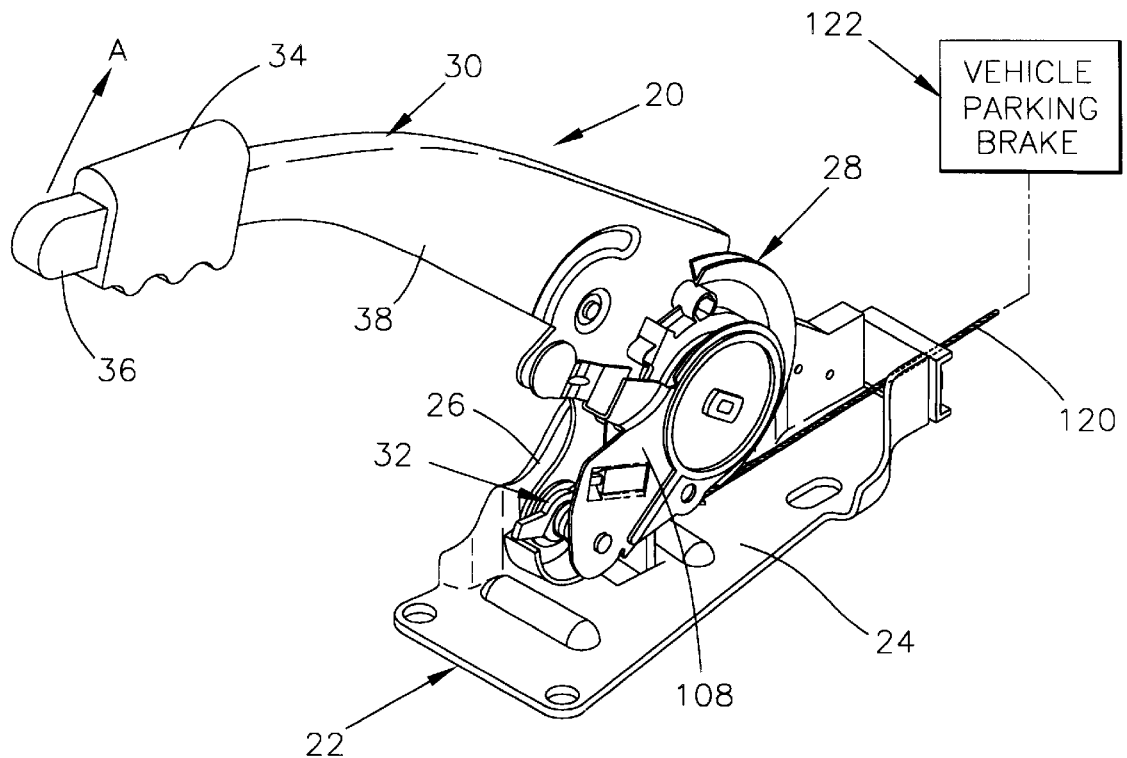
FIG. 1 is a perspective view, with parts broken away, showing a parking brake operating mechanism embodying the invention.

The parking brake operating mechanism 20 of FIG. 1 is of the type which is mounted on the floor of an automotive vehicle so that the vehicle operator has manual access to it to readily apply and release the parking brake. It has a mounting bracket 22 which is secured to a suitable part of the vehicle such as the floor of the passenger compartment. The predominant features of this bracket are the base plate portion 24 and the support plate portion 26. The cable reel assembly 28 is supported by the support plate portion 26, as are the parking brake operating lever or handle 30 and the latch mechanism 32.

Figure 2:
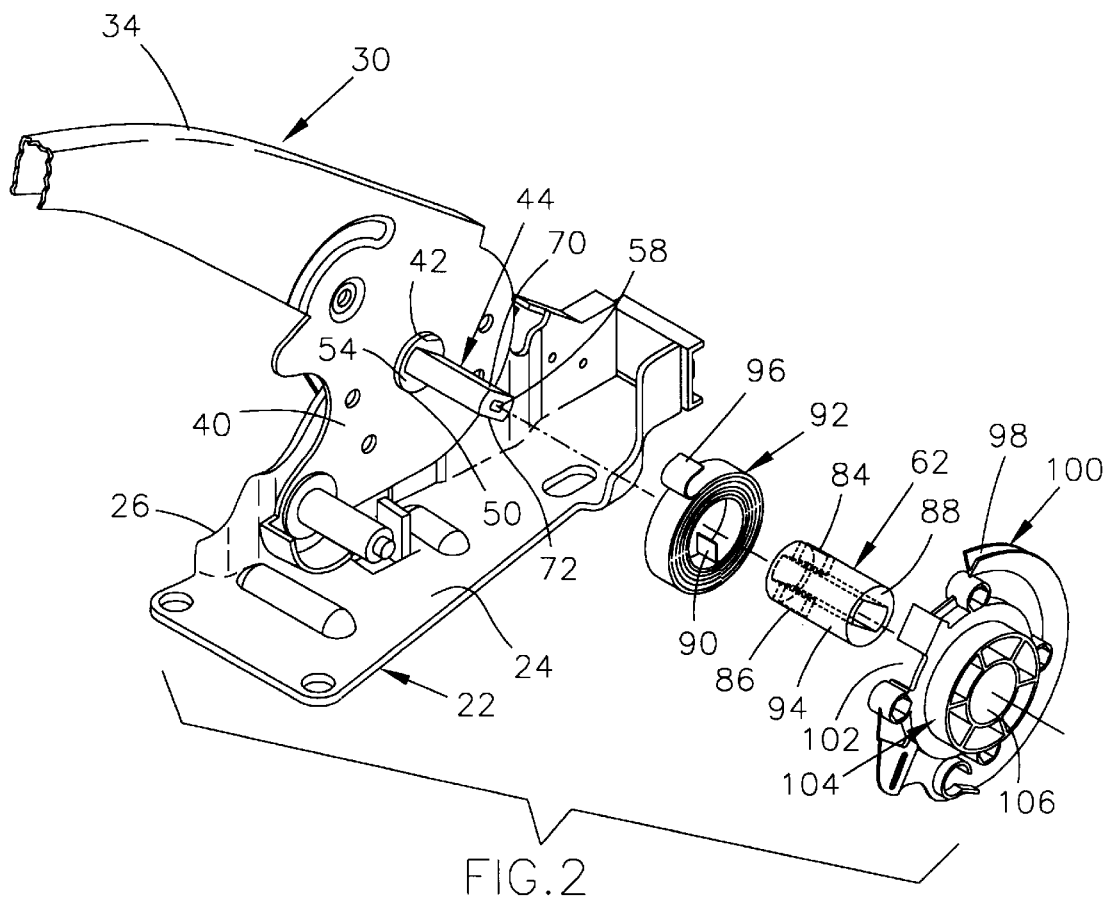
FIG. 2 is an exploded view of parts of the mechanism of FIG. 1 showing the various parts of the assembly embodying the invention in relation to other parts of the parking brake operating mechanism. Parts not directly related to structure embodying the invention have been omitted for clarity.

Further description of the mechanism 20 and various parts of it particularly relating to the invention refers to FIGS. 2 and 3 as well as to FIG. 1. The handle 30 has one end 34 adapted to be grasped manually by the vehicle operator and moved arcuately in the direction of arrow A of FIG. 1 from the parking brake released position to a parking brake applied position. Once the parking brake has been applied, it is held latched in the applied position by a latch mechanism such as that well known in the art. Likewise, the latch mechanism is released by the vehicle operator pushing inwardly on the release rod 36, that rod being carried by the handle end 34 and the handle main body section 38. This releases the pawl from the teeth of the typical parking brake latching mechanism and permits the vehicle operator to control the releasing movement of the parking brake handle 30. The other end 40 of the handle 30 is shown as being a planar section having an opening 42 therein. This opening receives a support pin 44 therethrough.

Support pin 44 is shown in FIGS. 2 and 3. It has one end 46 suitably formed to fit within an opening 48 of the mounting bracket support plate portion 26. Pin end 46 and opening 48 are so shaped or otherwise secured that the pin end is prevented from rotating in opening 48. Thus pin end 46 and opening 48 may be square, for example, and will be hereafter referred to as such, it being understood that they may have other complementary shapes so that rotational movement of the pin in the support plate portion opening 48 is prevented. In the preferred embodiment the pin end 46 is deformed by a riveting operation after it is inserted through opening 48 so that the pin is secured within opening 48 and the remainder of the pin extends perpendicularly away from the mounting bracket support plate portion 26.

The section of pin 44 adjacent to but axially spaced from the square end 46 is a diametrically enlarged circular axially extending bearing surface section 50 having side walls 52 and 54. Side wall 52 is abutted against the side surface of the mounting bracket support plate portion 26, as is shown in FIG. 3, and the outer circumference of section 50 forms the bearing surface 56. This bearing surface is received within opening 42 of the arm other end 40 and cooperates with the inner surface of opening 42 to provide bearing support for the handle assembly 30.

The pin 44 has another end 58 axially spaced from bearing surface side wall 54 and a shank portion 60 extending between the bearing surface side wall 54 and end 58. A sleeve bushing 62 is slidably received on the pin shank portion 60, the inner surface 64 of the bushing 62 being so formed in mating relation with the shank portion 60 that the bushing 62 cannot rotate on the pin shank portion. While the cross-section shape of the pin shank portion 60 and the bushing inner surface 64 may be any of several non-circular configurations, in the preferred embodiment shown the pin shank portion 60 is shaped with opposed arcuate surface sections 66 and 68 joined by flat chordally extending surface sections 70 and 72, and the inner surface 64 of the bushing 62 has complementary arcuate surface sections 74 and 76 and flat chordally extending surface sections 78 and 80. The pin and the bushing may equally well have other mating cross-section shapes, such as a hexagon or other polygon, oval or other non-circular shape, or with only one flat chordally extending surface section, by way of example but not of limitation. One or more key slots and keys may be used if desired, or one or more tongue and groove arrangements. Manufacturing processes of making the pins 44 and the sleeve bushings 62 will often dictate the precise cross-section shapes. The important point is that the sleeve bushing must be slidable on the pin shank portion for ease of installation and removal as needed, yet must not be rotatable on the pin shank while installed on the pin shank.

As shown in FIGS. 3 and 4, the end 82 of the sleeve bushing 62 has transverse open slots 84 and 86 extending for a distance toward the other sleeve bushing end 88. Slots 84 and 86 are preferably diametrically opposed. The width and depth of each of these slots are related to the inner end 90 of the take-up spring 92 as will be described. If desired, only one such slot may be provided since only one slot is required or used for assembly and function. The provision of two slots for possible use in receiving the inner end of the take-up spring just makes the assembly process easier. Slots 84 and 86 are preferably formed in the transversely thicker parts of the bushing 62 as seen in FIG. 4, and therefore respectively intersect the flat chordally extending surface sections 78 and 80 as well as the outer bearing surface 94 of sleeve bushing 62. The reversely bent outer end 96 of spring 92 fits through an opening 102 in the reel section 98 of the reel element 100 so that it hooks over one edge of opening 102. Opening 102 is best seen in FIG. 2.

When assembled, sleeve bushing 62 fits within the hub section 104 of the reel element 100 so that the hub section inner surface 106 is in rotatable bearing relation with the outer surface 94 of sleeve bushing 62. Also, sleeve bushing 92 is axially movable within the hub section 104 for assembly purposes. Once assembled the cover plate 108 is operatively secured to the mounting bracket 22, as is shown in FIG. 1. This cover plate axially retains the sleeve bushing 62 in its proper operating position relative to the support pin 44 as well as relative to the reel element 100. The unnumbered arrows in FIG. 3 extending axially of the support pin 44, the reel element 100 and the sleeve bushing 62 indicate the directions of relative movement of the various pieces as they are assembled.

FIG. 1 shows, somewhat schematically, the parking brake cable 120 which has one end secured to the reel element so that it may be wrapped on that element as the parking brake is applied. It is led through appropriate openings to the remainder of the parking brake mechanism by which, when it is tensioned, the parking brake is applied, as is well known in the art.

FIGS. 5 through 10 show a modified sleeve bushing 162 which decreases the weight of the bushing while retaining its necessary strength for proper operation of the parking brake mechanism. FIGS. 5 and 7 clearly show slots 184 and 186 in end 182 of sleeve bushing 162. Slot 186 is also seen in FIG. 8. These slots are functionally identical to slots 84 and 86 in end 82 of sleeve bushing 62. Essentially, the outer bearing surface 194 of sleeve bushing 162 has a number of axially and circumferentially spaced depressions or recesses 200 formed therein so that the surface 194 has a lattice-work appearance. Sufficient material is maintained as part of the body of bushing 162 so as to take the various loads thereon. As shown in FIGS. 6 and 7, the opposite end surfaces 182 and 188 of bushing 162 may also have axially extending depressions or recesses 202 therein to further reduce the amount of material in each bushing. As illustrated, the depressions or recesses in the sleeve bushing do not extend therethrough so as to become perforations, thus retaining the characteristic of the sleeve bushing as a solid bushing. Bushing 162 preferably has its inner surface 164 formed the same as inner surface 64 of bushing 62 so that it is fully substitutable for bushing 62 in the cable reel assembly 28, whatever the specific cross section of the pin shank portion 60 and the mating cross section of inner surfaces 64 and 164.

It is claimed:

1. For use in a vehicle having a parking brake operated by a parking brake operating mechanism having a fixed mounting bracket, a parking brake lever having one end adapted for gripping by a vehicle operator and its other end operatively mounted on the bracket for arcuately rotatable movements relative thereto in parking brake applying and releasing directions:

a cable reel assembly having a reel element comprised of a coaxially aligned reel section and a hub section, said reel section having a recess therein and said hub section having an inner surface, said hub section being connected to and supporting said reel section, said reel section being adapted to be fastened to the parking brake lever other end, said reel section also being adapted to having a parking brake cable thereon with one cable end attached thereto and the other cable end operatively attached to operate a parking brake when tensioned by arcuate rotation of said reel section in one arcuate direction, said reel section also being adapted to release the parking brake when said reel section is arcuately rotated in the opposite arcuate direction;

a take-up spring received in said recess of said reel section and having a first end and a second end, said first end being attached to said reel section;

a sleeve bushing received in said reel element, said sleeve bushing having an outer surface having rotatable bearing relation with said inner surface of said hub section, said sleeve bushing extending axially through said reel section, said sleeve bushing further having said second end of said take-up spring attached thereto;

and an axially extending pin having first and second ends, said first end being adapted to be secured in fixed relation to the mounting bracket, said pin also having a bearing surface adjacent to said first pin end adapted to extend axially through an opening in the parking brake lever other end in arcuately rotatable bearing relation therewith, said pin further having a pin shank portion intermediate said pin bearing surface and said pin second end, said pin shank portion being received axially through said sleeve bushing in axially slidable but rotatably fixed relation with said bushing.

2. The cable reel assembly of claim 1 wherein said sleeve bushing is made of a material having a specific gravity less than the specific gravity of said pin.

3. The cable reel assembly of claim 2 in which the material from which said sleeve bushing is made is one of a group of materials comprising:

a glass-filled polyamide (Nylon), an acetal (Delrin) with one or more well-known strength additives; an aluminum alloy; and powdered metal.

4. The cable reel assembly of claim 2 in which the material from which said sleeve bushing is made is a plastic composition having a specific gravity which is substantially less than the specific gravity of said pin.

5. The cable reel assembly of claim 1 wherein said pin is made of steel and said sleeve bushing is made of a plastic capable of withstanding the maximum predetermined bearing load exerted from said reel hub section through said sleeve bushing to said pin while having a specific gravity substantially less than that of said pin.

6. The cable reel assembly of claim 1 wherein said sleeve bushing between its diametrically spaced inner and outer surfaces is a solid sleeve having continuous inner and outer bearing surfaces.

7. The cable reel assembly of claim 1 wherein said sleeve bushing is a solid sleeve bushing formed with indentations in said outer surface thereof and thereby causing that surface to be decreased in effective area and the weight of said sleeve bushing to be decreased in relation to a solid sleeve bushing of the same overall dimensions and material having a continuously smooth bearing surface, said solid sleeve bushing formed with said indentations having sufficient bearing compression load strength to carry only the bearing compression loads exerted thereon by said cable reel section.

8. The cable reel assembly of claim 7 wherein said sleeve bushing also has opposite outer end surfaces formed with indentations in said outer end surfaces, decreasing the weight of said sleeve bushing in relation to a solid sleeve of the same overall dimensions and material which has continuous inner and outer bearing surfaces.

9. The cable reel assembly of claim 1 wherein said pin, when attached to said mounting bracket and having said parking brake lever arcuately rotatably mounted thereon with said cable reel assembly reel section having a parking brake cable attached thereto and to a parking brake to apply tension forces through the parking brake cable to apply the parking brake, is subjected to bearing load compression forces operatively transmitted separately from said parking brake lever and from said cable reel section, and said sleeve bushing is subjected only to bearing load compression forces transmitted from said reel element hub section and torsional forces transmitted from said take-up spring, when the parking brake lever is operated to apply the vehicle parking brake.

10. In a parking brake system for a vehicle, said parking brake system including a parking brake, a parking brake cable having first and second ends, and a parking brake operating mechanism when selectively operated operating said parking brake by tensioning said parking brake cable to apply said parking brake and releasing the tension of said parking brake cable to release said parking brake;

and said parking brake operating mechanism having a fixed mounting bracket, a parking brake lever having a first end adapted for actuation by a vehicle operator and a second end having an opening therein and being operatively mounted on said bracket for arcuately rotatable movements relative thereto in parking brake applying and releasing directions; the improvement comprising:

a cable reel assembly having
  a reel element comprised of a coaxially aligned reel section and a hub section, said hub section being connected to and supporting said reel section,
  said reel section having a recess therein and said hub section having an inner surface, said reel section being fastened to said parking brake lever second end, said reel section also having a portion of said parking brake cable received thereon, said parking brake cable having said first cable end attached to said reel section and said second cable end operatively attached to said parking brake to operate said parking brake when tensioned by arcuate rotation of said reel section in one arcuate direction to apply brake applying force to said parking brake, said reel section also acting to release said parking brake by releasing the brake applying tension in said parking brake cable when said reel section is arcuately rotated in the opposite arcuate direction;
  a take-up spring received in said recess of said reel section and having a first end and a second end, said first end being attached to said reel section;
  and a sleeve bushing received in said reel element, said sleeve bushing having an outer surface having rotatable bearing contact relation with said inner surface of said hub section,
  said sleeve bushing extending axially through said reel and hub sections,
  said sleeve bushing further having said second end of said take-up spring attached thereto;
and an axially extending support pin having first and second ends, said first end being secured in fixed relation to said mounting bracket,
  said support pin also having a bearing surface adjacent to but axially spaced from said first pin end, said support pin bearing surface extending axially through said opening in said parking brake lever second end in arcuately rotatable bearing relation therewith,
  said pin further having a pin shank portion intermediate said pin bearing surface and said pin second end, said pin shank portion being received axially through said sleeve bushing in axially slidable but rotatably fixed relation with said bushing.

11. In a parking brake operating mechanism for a vehicle parking brake, a parking brake cable having first and second ends, a parking brake operating lever having first and second ends and when selectively operated being adapted to operate the vehicle parking brake by tensioning the parking brake cable to apply the parking brake and releasing the tension of the parking brake cable to release the parking brake;

and a fixed mounting bracket, said parking brake lever having its first end adapted for actuation by a vehicle operator and its second end having an opening therein and being operatively mounted on said bracket for arcuately rotatable movements relative thereto in parking brake applying and releasing directions;

the improvement comprising:
  a support pin having a first end and a second end with said first end operatively secured to said mounting bracket, a bearing surface section adjacent said pin one end, and a shank section formed between said bearing surface section and said pin second end, said support pin bearing surface section receiving said parking brake lever second end opening thereabout in load compression bearing relation with the bearing load on said support pin bearing surface section being the bearing load caused by parking brake apply and releasing actions of said parking brake lever,
  a cable reel assembly having a cable reel section with said first end of said parking brake cable secured to said cable reel section and a portion of said parking brake cable adjacent said cable first end being on said reel section, said reel section being selectively rotated through an arc to apply parking brake apply tension to said parking brake cable by movement of said parking brake lever;
  said cable reel assembly further having a sleeve bushing on which said cable reel assembly is arcuately movable and through which the bearing load of said cable reel section is exerted through said sleeve bushing, said sleeve bushing being mounted on said support pin shank section for transmission of cable reel section bearing loads therethrough and thence to said mounting bracket.

12. The invention defined by claim 11 wherein said cable reel assembly sleeve bushing is sufficiently strong to carry said cable reel section bearing loads, but by having said parking brake lever bearing loads transmitted directly to said support pin so as to bypass said sleeve bushing, is constructed of lighter weight material and a structural arrangement sufficient to only be able to carry said cable reel section bearing loads.

13. The invention defined by claim 11 wherein said sleeve bushing is made of a material having a specific gravity less than the specific gravity of said pin.

14. The cable reel assembly of claim 11 in which the material from which said sleeve bushing is made is one of a group of materials comprising:
  a glass-filled polyamide (Nylon), an acetal (Delrin) with one or more well-known strength additives; an aluminum alloy; and powdered metal.

15. The cable reel assembly of claim 11 in which the material from which said sleeve bushing is made is a plastic composition having a specific gravity which is substantially less than the specific gravity of said support pin.

16. The cable reel assembly of claim 11 wherein said pin is made of steel and said sleeve bushing is made of a plastic capable of withstanding the maximum predetermined bearing load exerted from said reel hub section through said sleeve bushing to said pin while having a specific gravity substantially less than that of said pin.

17. The cable reel assembly of claim 11 wherein said sleeve bushing between its diametrically spaced inner and outer surfaces is a solid sleeve having continuous inner and outer bearing surfaces.

18. The cable reel assembly of claim 11 wherein said sleeve bushing is a solid sleeve bushing formed with indentations in said outer surface thereof and thereby causing that surface to be decreased in effective area and the weight of said sleeve bushing to be decreased in relation to a solid sleeve bushing of the same overall dimensions and material having a continuously smooth bearing surface, said solid sleeve bushing formed with said indentations having sufficient bearing compression load strength to carry only the bearing compression loads exerted thereon by said cable reel section.

* * * * *